United States Patent
Reed et al.

(10) Patent No.: US 8,528,718 B2
(45) Date of Patent: Sep. 10, 2013

(54) DUAL HOPPER TUBULAR FOOD PRODUCT LAUNCHER AND METHOD WITH ROBOTIC PICK BELT

(75) Inventors: George Reed, Waynesboro, VA (US);
Joseph Posge, Cincinnati, OH (US);
Keith Hopkins, Waynesboro, VA (US)

(73) Assignee: F. R. Drake Company, Waynesboro, VA (US)

( * ) Notice: Subject to any disclaimer, the term of this patent is extended or adjusted under 35 U.S.C. 154(b) by 339 days.

(21) Appl. No.: 12/912,249

(22) Filed: Oct. 26, 2010

(65) Prior Publication Data

US 2011/0094852 A1    Apr. 28, 2011

Related U.S. Application Data

(60) Provisional application No. 61/255,245, filed on Oct. 27, 2009.

(51) Int. Cl.
*B65G 47/256* (2006.01)

(52) U.S. Cl.
USPC .......................... 198/347.1; 198/395; 198/396

(58) Field of Classification Search
None
See application file for complete search history.

(56) References Cited

U.S. PATENT DOCUMENTS

| | | | |
|---|---|---|---|
| 3,250,372 A | | 5/1966 | Wagner et al. |
| 4,976,582 A | | 12/1990 | Clavel |
| 5,314,055 A | * | 5/1994 | Gordon .......................... 198/395 |
| 5,358,595 A | | 10/1994 | Williams |
| 5,370,216 A | * | 12/1994 | Tsuruyama et al. .......... 198/395 |
| 6,779,647 B1 | * | 8/2004 | Nagler .......................... 198/395 |

OTHER PUBLICATIONS

Klas Bengtsson, Picking a Winner and Packing a Punch, ABB Review, Apr. 2008, ABB, Zurich, Switzerland.
A View on Machine Vision, Packaging, Apr. 30, 2008, ABB Robotics, Zurich, Switzerland.
High-End-Pickeranwendung in Verpackungsapplikation bei Unilever, ABB Connect, Oct. 17, 2006, ABB, Zurich, Switzerland.
Salami Under Control, Packaging, Jun. 30, 2007, ABB Robotics, Zurich, Switzerland.

* cited by examiner

*Primary Examiner* — Kavel Singh
(74) *Attorney, Agent, or Firm* — Berenato & White, LLC

(57) ABSTRACT

A tubular food product launching system and method for interacting with a product loading head is disclosed. The system includes a pick belt, positioned alongside product carrying intermediate belts. The pick belt supplies additional product to a product inspector or vision equipped robot cell to replace defective or missing product observed on the intermediate belt(s) with replacement product from the pick belt. The overall system speed, and pick belt speed, can be adjusted to accommodate varying product post-launcher fill-rates in accord with the nature of the product and the abilities and speed of the robot cell and/or product inspector, so as to reliably assure 100% final fill-rate as product is fed to the loading head.

18 Claims, 9 Drawing Sheets

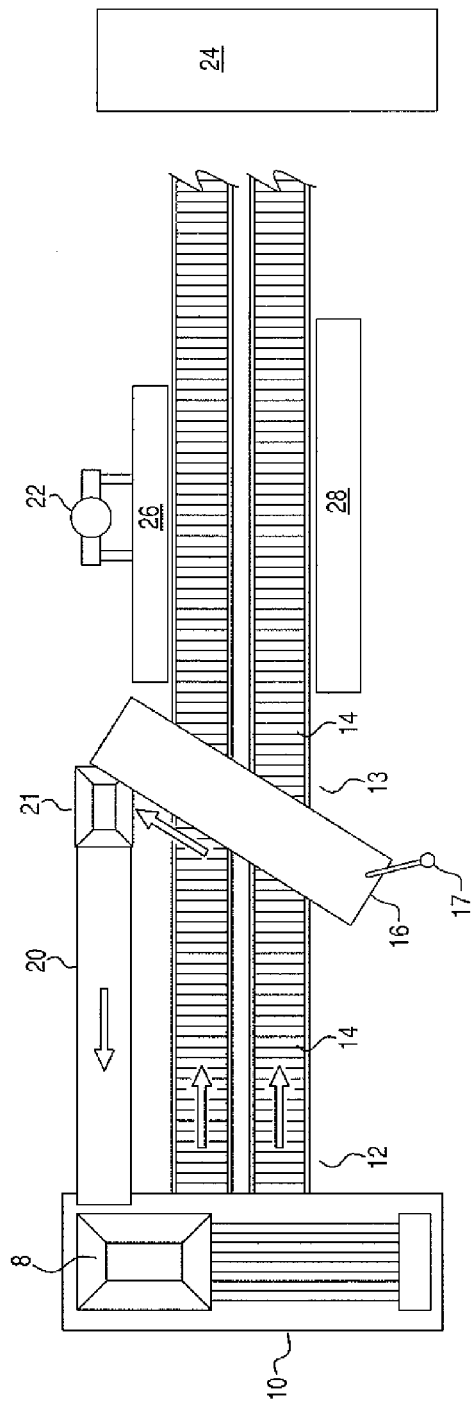
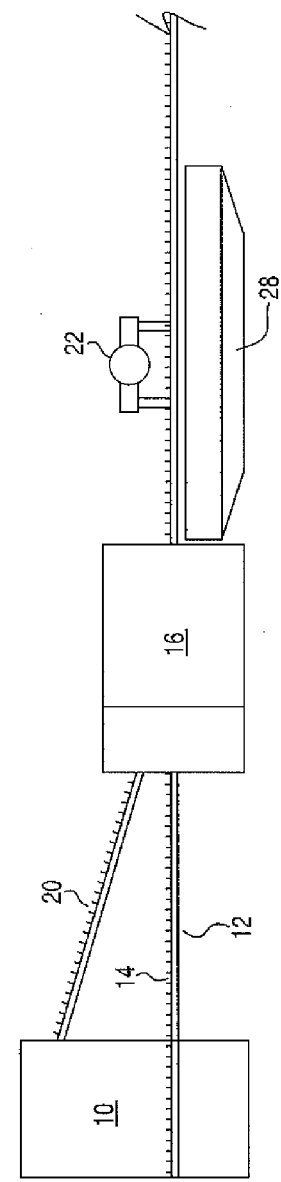
Fig. 1
Prior Art
Fig. 2
Prior Art

DUAL HOPPER TUBULAR FOOD PRODUCT LAUNCHER AND METHOD WITH ROBOTIC PICK BELT

CROSS-REFERENCE TO RELATED APPLICATION(S)

This application claims the benefit of U.S. Provisional Application 61/255,245, filed Oct. 27, 2009, the disclosure of which is hereby incorporated by reference in its entirety.

FIELD OF THE INVENTION

This invention relates to the field of tubular food handling machinery. Specifically, this invention relates to the field of hopper equipped product launchers wherein tubular food products are fed toward a package loader in a predetermined formation at a fill rate approaching 100%.

BACKGROUND OF THE INVENTION

As shown in FIGS. 1 and 2, prior art systems for launching tubular food products toward a package loader typically include a hopper 8 equipped launcher/unscrambler 10 aligned with one or more intermediate bucketed belt(s) 12. The launcher 10 floods the intermediate belt with excess product (105-120%) most of which ends up properly aligned in buckets 14 positioned along the bucketed belt 12. Excess and misaligned product is removed by lateral rake 16. The rake 16 urges the removed excess product toward a return hopper 21 feeding a return belt 20 that directs product back to a single hopper 8.

In the foregoing known system, the fill rate of the intermediate belt 13 buckets 14 beyond the rake 16 is upwards of 95%. However, for a 100% fill rate to be obtained prior to the loader 24, a human product inspector 22 is positioned along the intermediate belt between the rake 16 and the loading head 24. The inspector 22 removes defective product (i.e., still casing covered, misshapen, cut/broken, etc.), placing it into the reject chute 28, replaces the defects, and fills remaining blanks among the passing buckets 14 with product selected from the replacement tray 26. Owing to the rapid and continuous action of the inspector 22, the fill rate then becomes 100% as the intermediate belt heads toward the loading head 24. The inspector 22, or a fellow co-worker inspector, can from time-to-time feed excess product to the inspector 22 location by manually raising/lifting/pivoting the rake 16 away from the intermediate belt 12, using manual lift handle 17, to allow a temporary product surge past the rake 16 to the inspection location. Excess product is removed by the inspector 22 into the replacement tray 26 and the inspector 22 can continue replacing defects and filling empty buckets 14 from the re-stocked tray 26.

The known system described above has little or no capacity for adjustment without stopping the entire line and re-setting respective belt speed ratios (intermediate 12, return 20, and launcher 10) and actions of the various system components. Some types of product may launch more quickly, fill the buckets more consistently, and have fewer rejects than other product owing to texture/length/girth. As a result, the entire line, or distinct parts of the line, may need to be sped up or slowed accordingly to obtain consistent operation.

SUMMARY OF THE INVENTION

A tubular food product launcher system for supplying a loading head, comprises a product supply for supplying product at a selected feed rate; and an intermediate product carrying belt for accepting product from the product supply and carrying the product through an excess product rake, for removing excess and misaligned product from the intermediate belt, and toward a loading head. A pick belt, also receiving product from the product supply, runs alongside the intermediate belt. The pick belt feed rate is separately controlled from the feed rate of the intermediate belt. An inspection system removes and replaces defective product on the intermediate belt post rake, such that the inspection system replaces product on the intermediate belt with product selected from the pick belt. The inspection system may be a product inspector.

In accordance with this invention, a tubular food product launcher system is provided for supplying a loading head, comprising a dual hopper equipped product supply for supplying product at a selected feed rate; and an intermediate product carrying belt for accepting product from a first hopper of the dual hoppers in the product supply and carrying the product through an excess product rake. The rake removes excess and misaligned product from the intermediate belt and returns the removed product to a second of the dual hoppers in the dual hopper equipped product supply, and toward a loading head. A pick belt, receiving product from the second hopper in the product supply, runs alongside the intermediate belt. The pick belt feed rate is separately controlled from the feed rate of the intermediate belt. An inspection system removes and replaces defective product on the intermediate belt post rake, such that the inspection system replaces product on the intermediate belt with product selected from the pick belt.

These and other advantages of the aforementioned invention will occur to those of ordinary skill in the field as the following description and drawings are read. The invention herein is limited only by the scope of the appended claims.

BRIEF DESCRIPTION OF THE DRAWINGS

FIG. 1 is a top schematic view of a Prior Art tubular product launcher system.

FIG. 2 is a schematic profile view of the Prior Art launcher in FIG. 1.

DETAILED DESCRIPTION OF THE INVENTION

The invention will now be described with reference to the accompanying drawings, namely, FIGS. 3-11.

Figure 3:
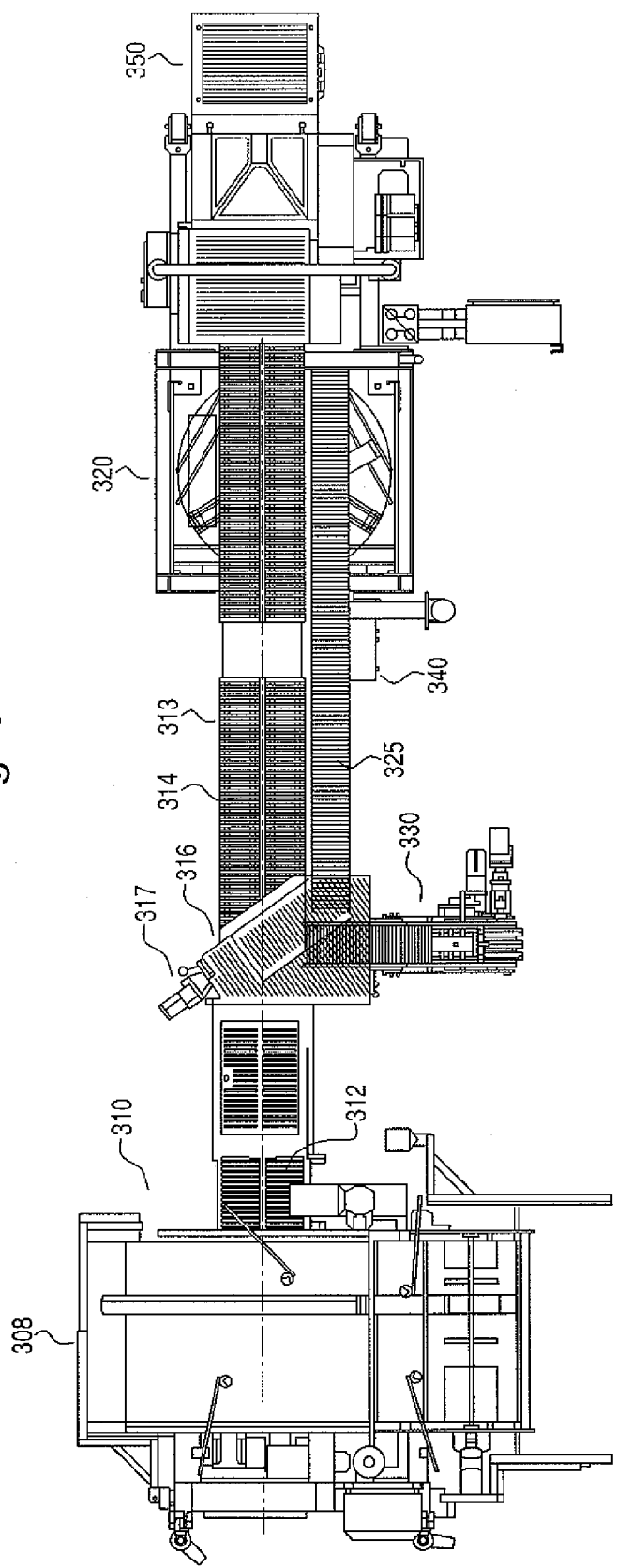
FIG. 3 is a product launcher in accord with the present invention equipped with a mini-pick belt launcher.

FIG. 3 shows an embodiment of the present invention where the system is equipped with an intermediate mini-launcher 330 for the pick belt 325. A dual hopper equipped unscrambler and launcher 308 feeds product onto the intermediate belt(s) 312. The belt(s) passes to a rake 316 (equipped with manual lift handle 317) where excess product is raked toward a hopper equipped mini-launcher 330. The mini-launcher 330 feeds the pick belt 325 with raked product and product added, as necessary, from the mini-launcher hopper. Collectively, the intermediate belt 313, post rake, and the pick belt 325 are passed through the robot cell 320. The robot has a two axis vision system 340 that enables mis-aligned/imperfect/missing product to be observed or detected. The robot 320, responding to the vision supplied position information, retrieves or picks imperfect product from the intermediate belt buckets 314 as they pass through the robot 320. The vision equipped robot also selects replacement product from the pick belt 325 and fills empty buckets 314. As a result, the intermediate belt 313 is at a 100% fill-rate of product as the belt 313 proceeds toward the loading head 350.

Figure 4:
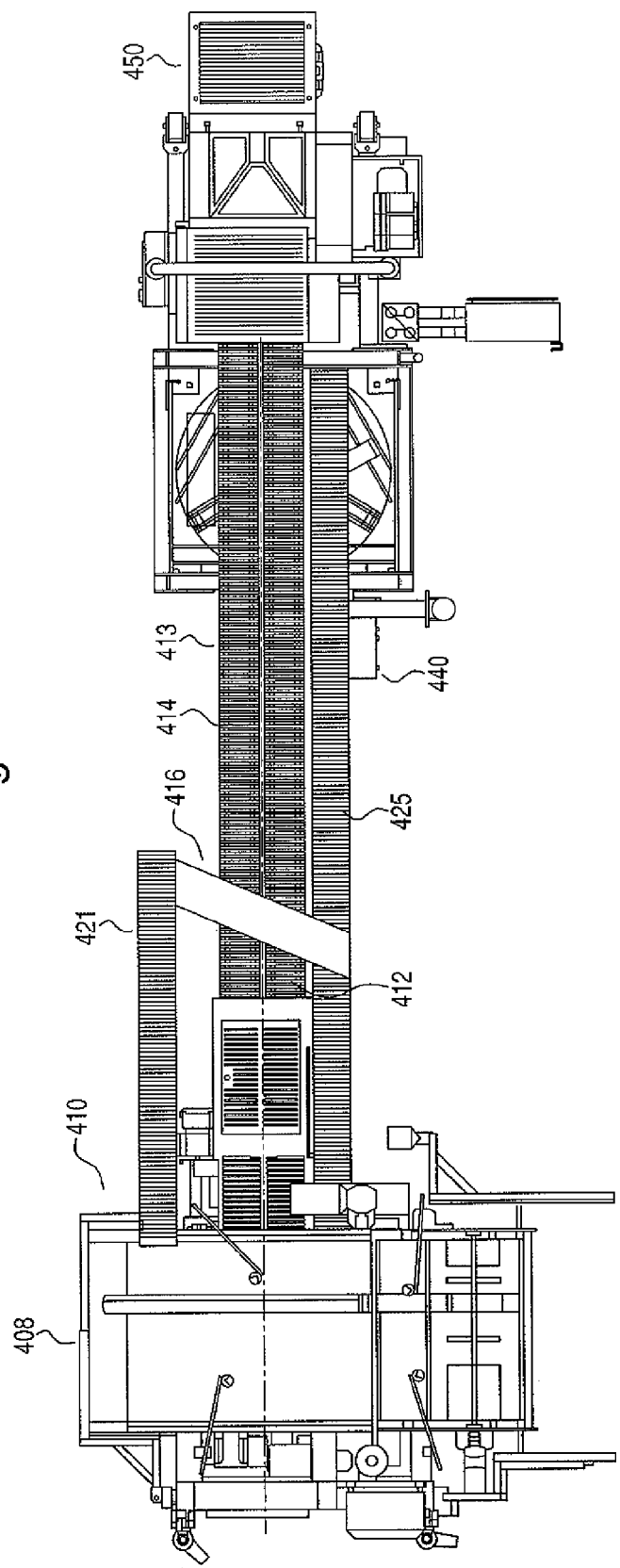
FIG. 4 is a product launcher in accord with the present invention equipped with a multi-hopper launcher for the pick belt and feeding a robot cell equipped intermediate conveyor.

FIG. 4 shows an embodiment of the present invention where the system is equipped with a product return system 421 returning rake removed product to a twin hopper equipped unscrambler launcher 408. The twin hopper equipped unscrambler and launcher 408 feeds product from the main hopper onto the intermediate belt(s) 412. Although shown with 2 intermediate belts, there can be a single, double, triple, or quad belt (etc.) intermediate belt combination, dependent on product (length, robustness, girth, loader requirements, and so forth). The intermediate belt(s) combination 412 passes to a rake 416 (equipped with manual lift handle) where excess product is removed toward the return system 421 that fills the second smaller hopper. The launcher 408 also feeds the pick belt 425 directly from the second and smaller of the dual hoppers. Collectively the intermediate belt 413, post rake, and the pick belt 425 are passed through the robot 420. The robot has a two axis vision system 440 that enables mis-aligned/imperfect/missing product to be observed or detected. The robot 420 then retrieves imperfect product from the intermediate belt buckets 414 as they pass through the robot 420. The robot also selects replacement product from the pick belt 425 and fills any remaining empty buckets 414. As a result, the intermediate belt 413 is at a 100% fill-rate of product as the belt 413 proceeds toward the loading head 450.

Figure 5:
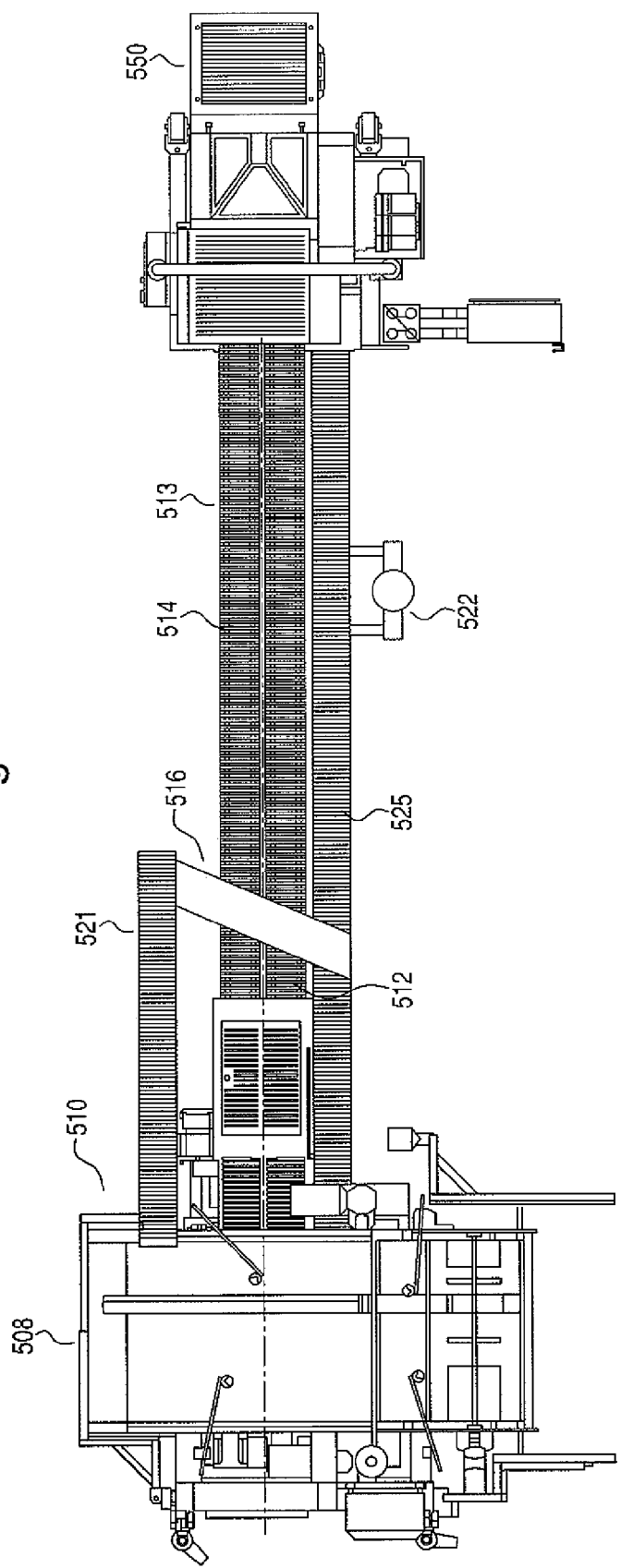
FIG. 5 is a product launcher in accord with the present invention equipped with a multi-hopper launcher for the pick belt and feeding a product inspector monitored intermediate belt.

FIG. 5 shows an embodiment of the present invention where the system is equipped with a product return system 521 returning rake removed product to a twin hopper equipped unscrambler launcher 508. The twin hopper equipped unscrambler and launcher 508 feeds product onto the intermediate belt(s) combination 512. The intermediate belt system passes to a rake 516 (equipped with manual lift handle) where excess product is removed toward the return system 521 and into the smaller hopper in the launcher 508. The launcher 508 also feeds the pick belt 525 from the second smaller hopper. Collectively the intermediate belt(s) 513 post rake and the pick belt 525 are passed through to the product inspector 522. The inspector 522 observes mis-aligned/imperfect/missing product. The inspector then retrieves imperfect product from the intermediate belt buckets 514 as they pass. The inspector 522 also selects replacement product from the pick belt 525 and fills any remaining empty buckets 514. As a result, the intermediate belt 513 is at a 100% fill-rate of product as the belt 413 proceeds toward the loading head 550.

Figure 6:
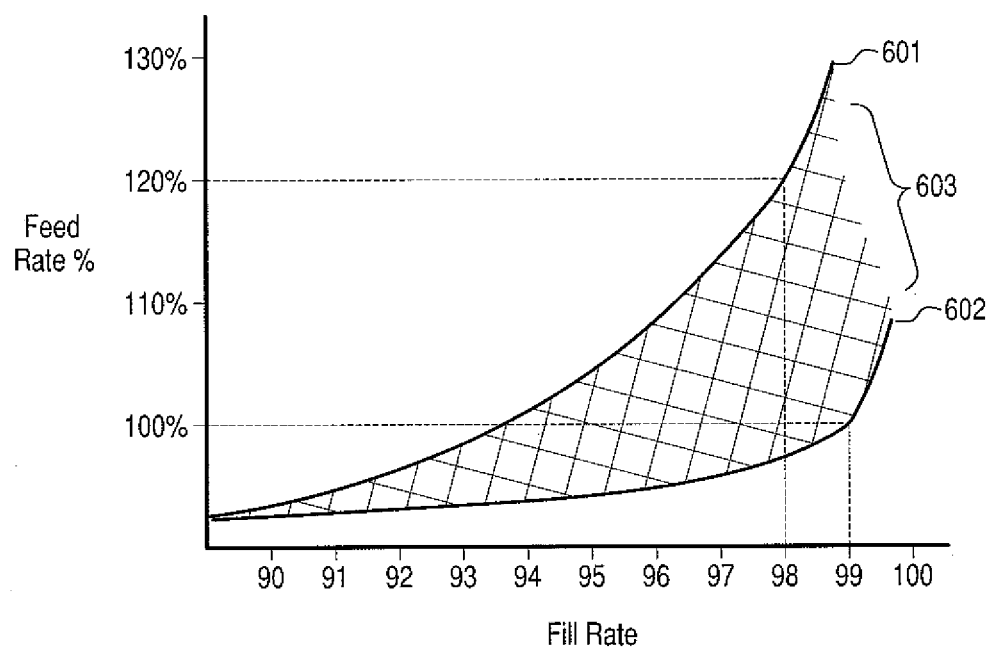
FIG. 6 is a graph showing the effect of the current invention on feed rate vs. fill-rate.

FIG. 6 shows the improvement in reducing product volume that can be subject to return when using the present system. Curve 601 is an approximation of the relationship between the feed or supply rate of product from the unscrambler towards the rake in the prior art such that a relatively high post rake fill rate (98%) of the intermediate belt buckets is achieved. Product is over supplied in the prior art and thusly may subject the product to the risk of return to the hopper. However, this high feed rate, up to 120%, and post rake fill rate is necessary such that a product inspector can keep up with the missing/imperfect 2-4% of passing product by accessing the replacement tray. In addition, owing to the uncertainty of inspector performance and product robustness (i.e., resisting the effects of machine handling), the rate of manual surging of product via rake lifting to re-supply the product inspector is ad hoc. The prior art system has to be stopped and adjusted to achieve consistency. The system of this invention can be fed within a far greater, and adjustable, range of product over/under supply depending on operator requirements. At start up, the rate of initial over supply may be as high as 120% so as to fill the pick belt and initiate return supply to the second hopper. However, during subsequent operation, and dependent on observed fill rates/defect rates/replacement needs, the over-supply may, in fact, become an under supply at a 95% and then servo or variably controlled to stop/start increment faster/slower depending on operational requirements.

Curve 602 shows an approximation of the relatively higher fill rate achieved by the present invention combined with a lower initial feed rate toward the rake. The shaded area 603 between the curves 601 and 602 is product that would ordinarily be subject to potential re-cycling or return within the prior art system. As shown, the invention substantially reduces the potential for return using either a human product inspector or a robot. The pick belt can be incrementally run faster or slower, have its own feed rate adjusted, and/or be servo/variable speed equipped to actuate on a demand basis. This pick belt control system can be set/adjusted in accord with the pick belt positioned product inspector or in accord with the robot control system. The robot vision system may sense insufficient pick belt product and increase pick belt speed, or may sense too much product and either stop or slow the pick belt accordingly. Likewise, a product inspector may work faster than a colleague previously occupying the station and increment the pick belt speed to a faster pace. However, since the robot can work more consistently for longer periods, the overall results obtained with a robot can be more efficient and result in less overall returning/recycling of product from the intermediate belt, thru the return system to the dual hopper equipped launcher. The robot can also run with a somewhat "starved" intermediate belt as compared to a human inspector. That is, since the robot can remove and replace at a higher rate than the human inspector, the feed rate to the rake can be even lower, with even less product raked away and returned.

Figure 7:
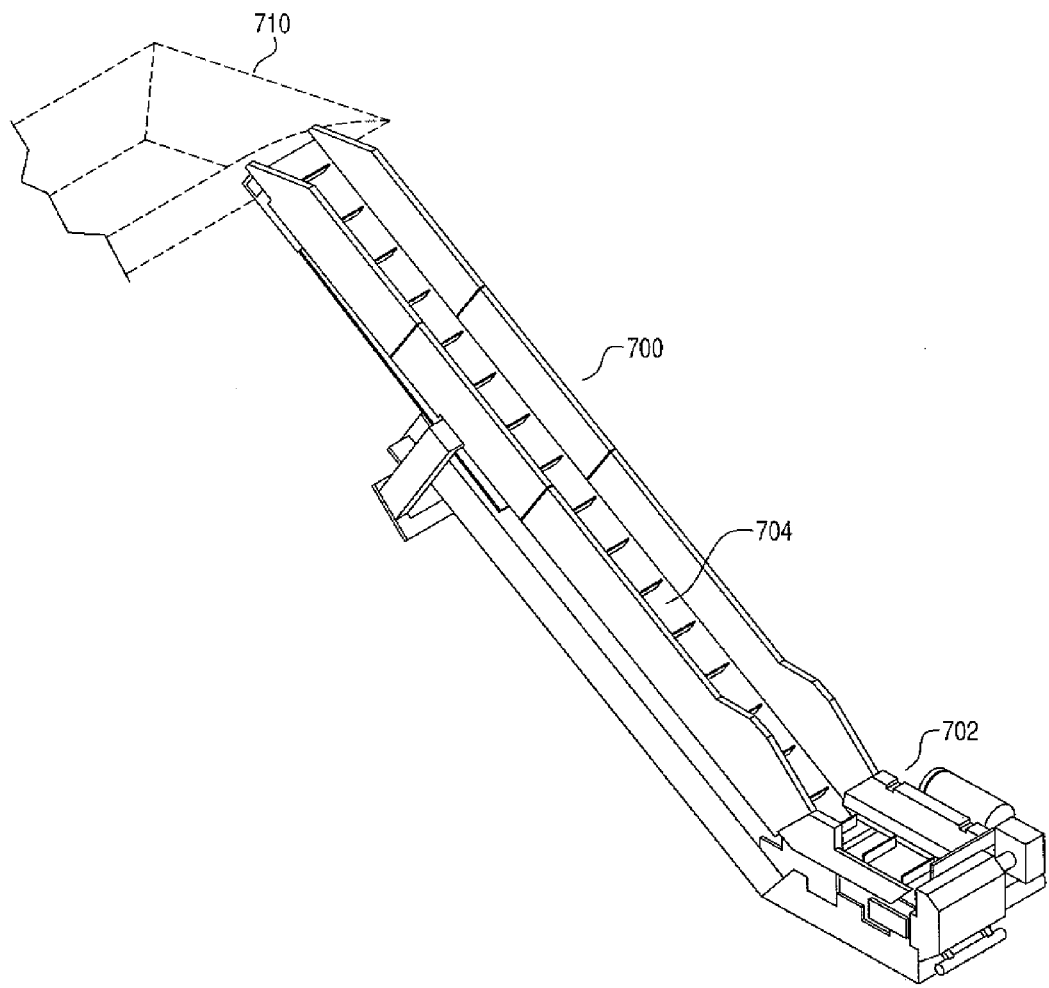
FIG. 7 shows the return belt system for product removed from the intermediate belt by the rake.

FIG. 7 shows the return system 700 positioned alongside the rake in FIGS. 4 and 5. The return system 700 (labeled 421 and 521 in FIGS. 4 and 5 respectively) includes a receiver 702, elevating belt 704, and feeds returned product back toward the unscrambler hopper(s) 710. The return system 700 feeds a dual hopper system which, in turn, provides product to the intermediate belt(s) (main hopper) and pick belt (second hopper).

Figure 8:
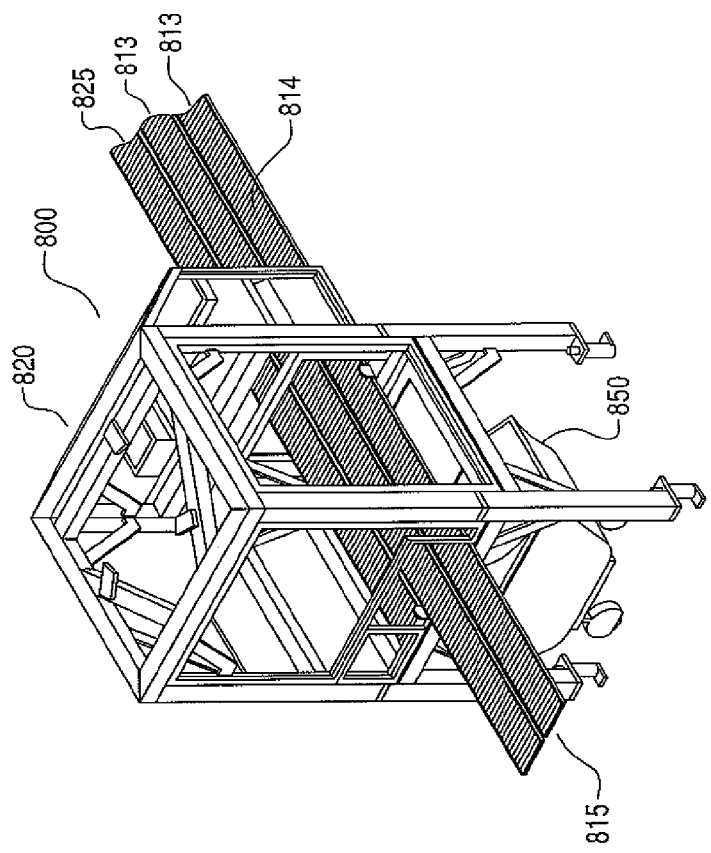
FIG. 8 shows the intermediate and pickbelt interaction with the robot cell.

FIG. 8 shows a typical robot cell system 800 suitable for use in the present system. A commercial robot suitable for use in the present system is an ABB brand Model IRB 360 "Flex Picker" delta type robot. U.S. Pat. No. 4,976,582 discloses a suitable articulated robotic system; the disclosure of which is incorporated herein by reference thereto. The frame 820 provides sufficient space to accept the pick belt 825 and intermediate belt(s) 813 to pass through the two-axis vision system 840. The vision system is a part of the control system for articulated pick elements that engage and retrieve imperfect/misaligned product and replace the removed product from intermediate belt 813 with pick belt 825 product. The buckets 814 on the intermediate belt arrive at the cell with a 95-98% fill rate and include some imperfect/misaligned product. The buckets on intermediate belt 815 post robot cell 800 are filled at 100% in correct alignment with acceptable product. The fill rate pre-robot is achieved by ultimately slightly starving the product feed to the rake. Instead of a constant 105-120% oversupply as in the prior art, the initial product supply rate herein, post start-up, can be reduced towards 100% or even slightly below. As a result, only a small proportion of product is subject to return to the hopper. The pick belt 825 is run faster and fuller than with a human inspector and keeps the robot 800 consistently busy removing imperfect product and filling empty buckets 814. Removed product is discarded into bin 850.

Figure 9:
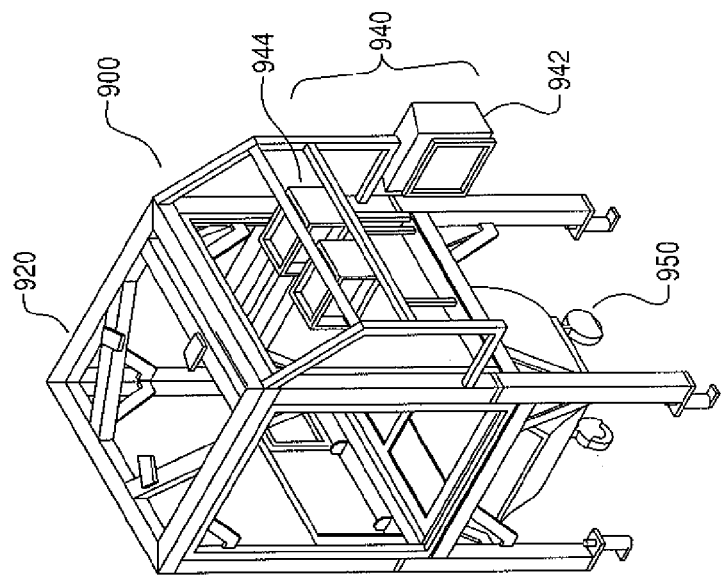
FIG. 9 shows the two-axis vision system for the robot cell on the intake side of the cell.

FIG. 9 shows the robot cell 900 with no belts present. The frame 920 supports the articulated pick elements (shown in FIGS. 10 and 11 herein) and the horizontal 942 and vertical 944 elements of the vision system 940. A product discard bin 950 is also shown beneath the robot frame 920.

As set forth above, the present invention equips the system between the launcher and loading head with a $3^{rd}$, or extra, belt, labeled as a "pick belt". The pick belt can be fed from various sources. The pick belt can be fed directly by excess product from the rake being directed to a pick belt exclusive mini-launcher. Or, in another embodiment the pick belt can be fed by the return belt which, in turn, is fed by the excess product from the rake, but is returned to a special split hopper, reserved for returned product, into the main launcher.

In all embodiments, the pick belt advantageously runs alongside the intermediate belt(s) and feeds product to either a product inspector or a vision equipped robot. The inspector or robot then removes defective product from the intermediate belt and fills blanks in the buckets with product taken from the pick-belt. When robot equipped, the system launcher can "starve" the intermediate belt(s) for product, that is, the intermediate belt can be supplied at an approximate 100% rate, with misaligned and excess product still being raked, yielding a post rake fill-rate of perhaps 95%. This overall intermediate belt deficiency can be made up by a relatively higher supply rate 8-10% being provided to the pick belt from the main launcher/mini-launcher depending on the specific configuration of the system. The pick-belt can be servo equipped, or equipped with a variable speed drive, to run faster or slower or stop altogether depending on demand for replacement product by the robot. The controls for the pick belt and mini-launcher are advantageously linked to the robot control system to directly relate robot pick belt demand operation.

In the case where the system is not robot equipped but, instead, uses a product inspector to remove/replace/fill the intermediate belt to 100% ahead of the loading head, the supply rate of the pick belt can likewise be adjusted to the level of capacity of the individual inspector and the post rake fill rate of the intermediate belt. The over-supply to the intermediate belt may be set to 105% yielding a post rake fill rate of 98%, with the pick-belt supplying the remaining 2-4% owing to blanks (empty buckets) and defects in the intermediate belt. This system can be fined tuned with pick belt speeds, stopping/starting, and fill rates to enable relaxed work by the product inspector in accord with the unique characteristics of the product being processed.

Such a $3^{rd}$ belt equipped system can greatly reduce, if not completely eliminated, the return of product to the hopper from the rake. Owing to lower oversupply of initial product to the intermediate belt from the launcher, much less product is engaged by the rake. In addition, the system can be fine-tuned in accord with the product being supplied and/or the inspector in the system. Some product is easier to handle, i.e., shorter, more robust, than other product. In such case, the line can be run somewhat faster with an acceptable fill-rate and not over work the inspector or robot (if so equipped). Other product may need to run somewhat slower in order for machine induced product defects to be maintained below an acceptable threshold. This fine tuning can be done during operation without the need for a cessation of line operation.

Figure 10:
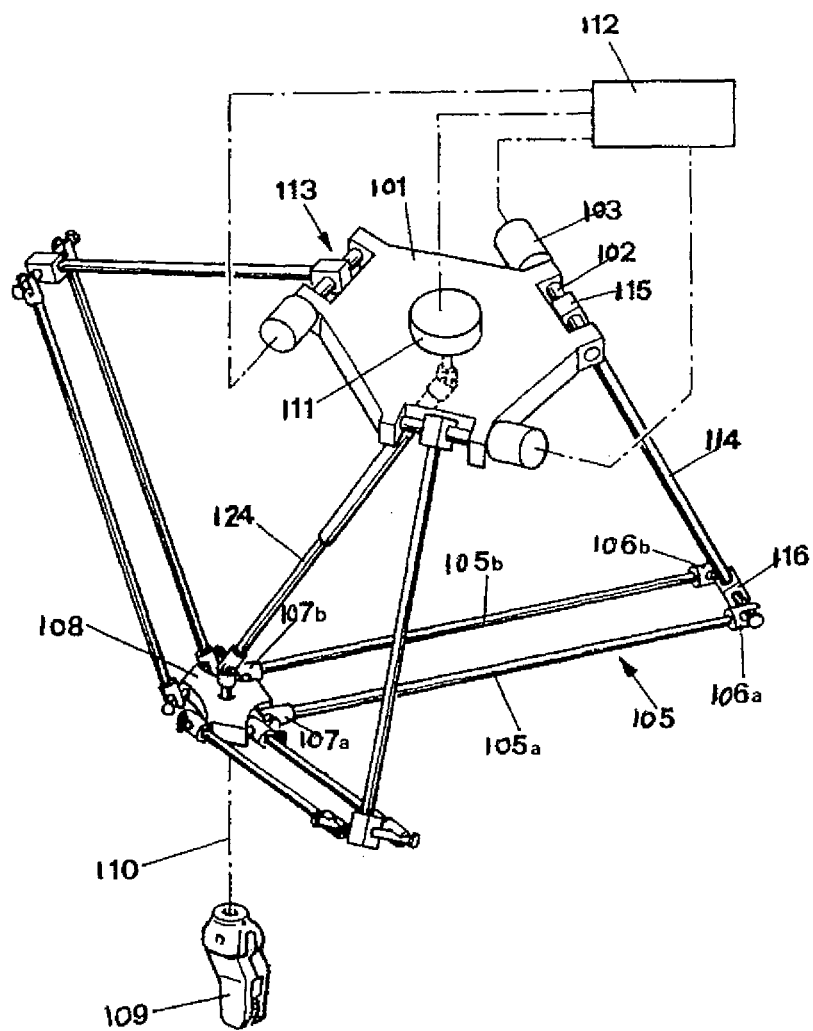
FIG. 10 shows an articulated robot picking system suitable for use in the present invention.

Referring to FIG. 10, the robot device includes one base member 101 and one movable member 108. The base member 101 includes three rotary actuators 113 each including one fixed portion 103 integral with the base member 101, the axes 102 of which are coplanar. Control arms 114 are mounted in the form of a rigid assembly at one end 115 of them respectively on each of the axes of rotation 102, so that the longitudinal axis of each arm is perpendicular to its corresponding axis of rotation 102. The other end 116 of each of the control arms 114 is integral with two linking bars 105*a*, 105*b* by way of two double articulations in cardan form 106*a*, 106*b*. Each of the two groups of linking bars 105*a*, 105*b* is connected otherwise by way of two double articulations 107*a*, 107*b*, of cardan type to the movable member 108 the movement of which may thus be controlled by the motion of the control arms 4. In a second embodiment shown in FIG. 11, the articulations 106*a*, 106*b* and 107*a*, 107*b*, may be replaced by ball-and-socket joints 126*a*, 126*b* and 127*a*, 127*b*.

In the configuration represented in FIG. 10, the linking bars 105*a*, 105*b* remaining constantly in parallel form the sides of a parallelogram which moves in space and is deformable as a function of the respective motions of the control arms 114. The result is that the movable member 108 remains in parallel with itself, whatever the motions of the control arms may be. The same configuration may be obtained in a third embodiment in which if the pairs of linking bars 105*a*, 105*b* are replaced by single bars, each of the bars being mounted by way of an articulation of the cardan type fixed respectively to each of their ends, on the one hand onto one of the control arms 114 and on the other hand onto the movable member 108 respectively.

The three actuators 113 are connected by way of adequate amplifiers to a managing computer 112 intended for controlling the motions of the control arms 114.

Figure 11:
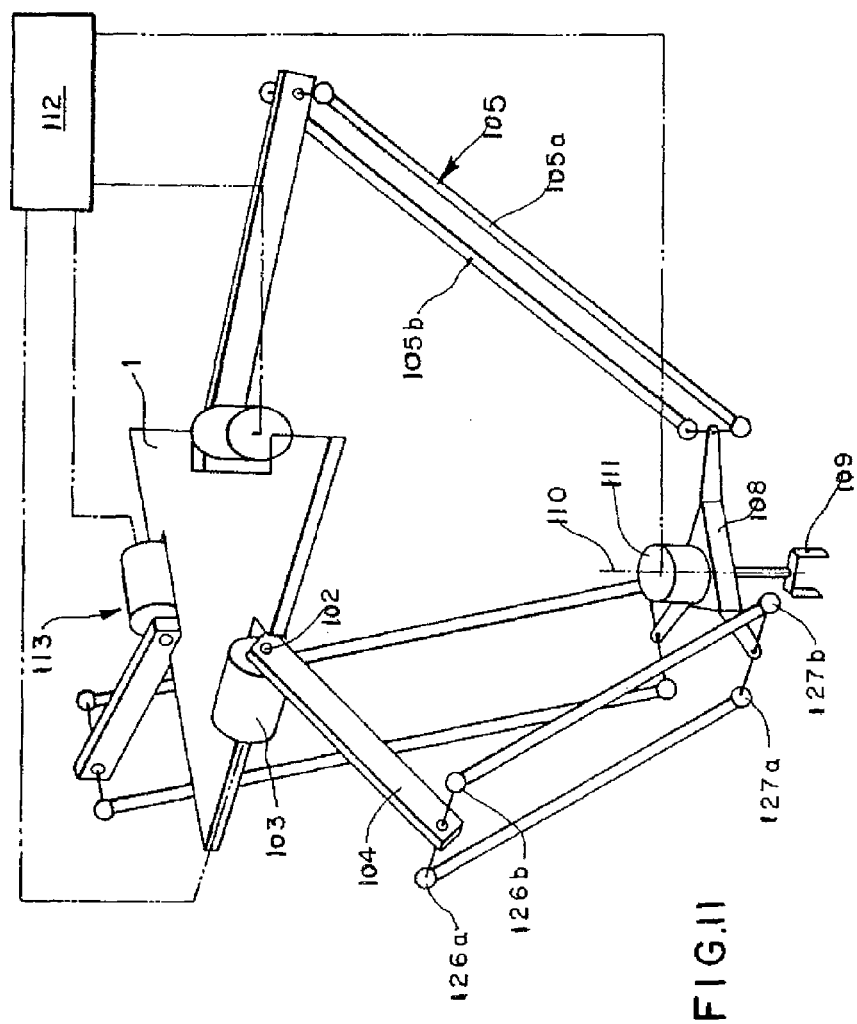
FIG. 11 is an alternative embodiment of the robot picking device shown in FIG. 10.

A working member 109 such, for example, as a gripping member, a tool, a sucker or a syringe may be arranged on the movable member 108. In the example represented in FIG. 10, a fourth degree of freedom of the device consists in the rotation of the working member about an axis 110 perpendicular to the movable member 108. This rotation is controlled by a fixed motor 111 arranged on the base member 101, the rotation being controlled by way of a rod system (for example, a telescopic arm 124) and other transmission members. Of course in accordance with another variant, as shown in FIG. 11, the motor 111 may be attached to the movable member 108 and connected to the managing computer.

In accordance with another variant execution of the device of FIG. 10, but not shown, the configuration described above may be completed by providing the control of the two supplementary degrees of freedom intended for the tilting of the working member in space. The corresponding driving motors may be fixed onto the base member 101, the transmission of the motion to the working member being effected by a system of rods and/or belts, cardan joints and other transmission members. These motors may also be attached directly to the movable member 108, the motors being connected to the managing computer.

In the configuration of the device of the invention represented in FIG. 10, the ends of the three control arms integral with the base member 101 are arranged in accordance with an equilateral triangle. Of course this arrangement is in no way exhaustive. On the other hand, although the device has been represented with one base member and one movable member in the form of plates arranged horizontally, these members may have various forms and be oriented in multiple positions.

While the foregoing invention has been shown and described with reference to preferred embodiments, it will be understood by those of skill in the art that various changes in form and detail may be made thereto without departing from the spirit and scope of the invention as set forth in the appended claims.

The invention claimed is:

1. A tubular food product launcher system for supplying a loading head, comprising:
   a product supply for supplying product at a selected feed rate;
   an intermediate product carrying belt for accepting product from said product supply and carrying said product along a first direction through an excess product rake, for removing excess and misaligned product from said intermediate belt, and toward a loading head;
   a pick belt, also receiving product from said product supply, running alongside said intermediate belt in said first direction, said pick belt feed rate being separately controlled from the feed rate of said intermediate belt; and,
   an inspection station for removing and replacing defective product on said intermediate belt post rake, said inspection station replacing product on said intermediate belt with product selected from said pick belt.

2. A launcher system as in claim 1, wherein:
said inspection station includes a product inspector.

3. A launcher system as in claim 2, wherein:
said pick belt operation is controlled by said product inspector.

4. A launcher as in claim 1, wherein:
said inspection station is a vision equipped robot.

5. A launcher as in claim 4, wherein:
said robot includes an operation system inter-related with operation of said pick belt operation.

6. A launcher as in claim 5, wherein:
said feed rate from said product supply to said intermediate belt is capable of being varied between 95-120% of the capacity of the intermediate belt to receive product.

7. A tubular food product launcher system for supplying a loading head, comprising:
   a dual hopper equipped product supply for supplying product at a selected feed rate;
   an intermediate product carrying belt for accepting product from a first hopper of said dual hoppers in said product supply and carrying said product in a first direction through an excess product rake, said rake removing excess and misaligned product from said intermediate belt and returning said removed product to a second of said dual hoppers in said dual hopper equipped product supply, and toward a loading head;
   a pick belt, receiving product from said second hopper in said product supply, running alongside said intermediate belt in said first direction, said pick belt feed rate being separately controlled from the feed rate of said intermediate belt; and,
   an inspection station for removing and replacing defective product on said intermediate belt post rake, said inspection station replacing product on said intermediate belt with product selected from said pick belt.

8. A launcher system as in claim 7, wherein:
said inspection station includes a product inspector.

9. A launcher system as in claim 8, wherein:
said pick belt operation is controlled by said product inspector.

10. A launcher as in claim 7, wherein:
said inspection station is a vision equipped robot.

11. A launcher as in claim 10, wherein:
said robot includes an operation system inter-related with operation of said pick belt operation.

12. A launcher as in claim 11, wherein:
said feed rate from said product supply to said intermediate belt is capable of being varied between 95-120% capacity of said intermediate belt to receive product.

13. A tubular food product launcher system for supplying a loading head, comprising:
   a first product supply for supplying product at a selected feed rate;
   an intermediate product carrying belt for accepting product from said first product supply and carrying said product in a first direction through an excess product rake, for removing excess and misaligned product from said intermediate belt, and toward a loading head;
   a pick belt, receiving product from a second product supply, running in said first direction alongside said intermediate belt, said pick belt feed rate being separately controlled from the feed rate of said intermediate belt; and,
   an inspection station for removing and replacing defective product on said intermediate belt post rake, said inspection station replacing product on said intermediate belt with product selected from said pick belt.

14. A launcher system as in claim 13, wherein:
said inspection station includes a product inspector.

15. A launcher system as in claim 14, wherein:
said pick belt operation is controlled by said product inspector.

16. A launcher as in claim 13, wherein:
said inspection station is a vision equipped robot.

17. A launcher as in claim 16, wherein:
said robot includes an operation system inter-related with operation of said pick belt operation.

18. A launcher as in claim 17, wherein:
said feed rate from said product supply to said intermediate belt is capable of being varied between 95-120% of the capacity of the intermediate belt to receive product.

* * * * *